United States Patent

Wilmarth

[15] 3,692,932

[45] Sept. 19, 1972

[54] HORIZONTAL OSCILLATOR DISABLING CIRCUIT CONTROL APPARATUS

[72] Inventor: Paul Carleton Wilmarth, Indianapolis, Ind.

[73] Assignee: RCA Corporation, New York, N.Y.

[22] Filed: May 18, 1971

[21] Appl. No.: 144,464

[52] U.S. Cl. .................................178/7.5 R, 315/22
[51] Int. Cl. ...............................................H04n 5/44
[58] Field of Search ......178/7.3 R, 7.5 R; 315/22, 26

[56] References Cited

UNITED STATES PATENTS 3,611,002 10/1971 Wedam...................178/7.5 R

*Primary Examiner*—Robert L. Griffin
*Assistant Examiner*—George G. Stellar
*Attorney*—Eugene M. Whitacre

[57] ABSTRACT

Concurrently filed United States Patent application Ser. No. 144,457, entitled "HORIZONTAL OSCILLATOR DISABLING CIRCUIT" describes a means of shifting the frequency of the horizontal oscillator of a television receiver in the presence of high voltage increases which could cause X-radiation problems. As therein described, a negative direct voltage indicative of the developed ultor potential for its cathode-ray tube is combined with a relatively stable positive direct voltage to change the bias on a control transistor and the effective resistance in the time constant network determining the oscillator frequency. The present invention provides a further positive direct voltage to the transistor from the brightness control network of the receiver, so as to control the point at which the oscillator goes off frequency as a function of picture tube beam current. Such further voltage will be seen to reduce the criticality in determining the point at which the frequency shifting is to occur and the point at which the reproduced picture becomes unviewable.

4 Claims, 3 Drawing Figures

PATENTED SEP 19 1972 3,692,932

INVENTOR.
Paul C. Wilmarth
BY
Charles Brodsky
ATTORNEY

HORIZONTAL OSCILLATOR DISABLING CIRCUIT CONTROL APPARATUS

FIELD OF THE INVENTION

This invention relates to television receivers, in general, and to a modification of the horizontal oscillator circuitry disclosed in concurrently filed United States Patent application Ser. No. 144,457, entitled "-HORIZONTAL OSCILLATOR DISABLING CIRCUIT," in particular.

SUMMARY OF THE INVENTION

As is therein described, one method of determining the existence of receiver conditions which could give rise to possible X-radiations is to sense the magnitude of the horizontal flyback pulse and to shift the horizontal oscillator off frequency upon such magnitude exceeding a prescribed level. Specifically, the apparatus of the above-noted application serves to vary the resistance in an R-C time constant network determining the frequency of oscillation once the prescribed high voltage condition was sensed. During normal operation of the receiver—as monitored by a winding on the horizontal output transformer —, the resistance included the impedance exhibited between the collector and emitter electrodes of a saturated transistor. When a condition of excessive high voltage was reached, the transistor was rendered non-conductive, and the increase collector-to-emitter impedance effectively served to alter the rate at which a capacitor discharged in establishing the oscillator frequency.

It will be readily apparent that proper operation of such configuration requires a degree of criticality in the setting of the point at which the oscillator will be shifted off frequency, i.e., become disabled. It has been observed, however, that the need for such criticality exists more when the receiver is operating at low brightness level than when it is operating at higher brightness level. As will become clear hereinafter, the present invention reduces this need for low brightness criticality by effectively coupling the oscillator disable circuit in combination with the brightness control potentiometer. In such manner, the point at which the transistor will then become non-conductive to change the time constant resistance will vary as a function of brightness control setting. By effectively coupling this brightness voltage to the transistor, the curve of the disabling characteristic (a plot showing the high voltage at which oscillator disabling will occur as a function of picture tube beam current) can be made to more closely resemble the isodose curve established by the Health, Education and Welfare Department of the United STates Government in defining the limits of X-radiation for different picture tube beam currents with respect to which television receivers must comply.

BRIEF DESCRIPTION OF THE DRAWINGS

These and other advantages of the present invention will be more clearly understood from a consideration of the following drawings in which.

DETAILED DESCRIPTION OF THE DRAWINGS

Figures 1, 2, 3:
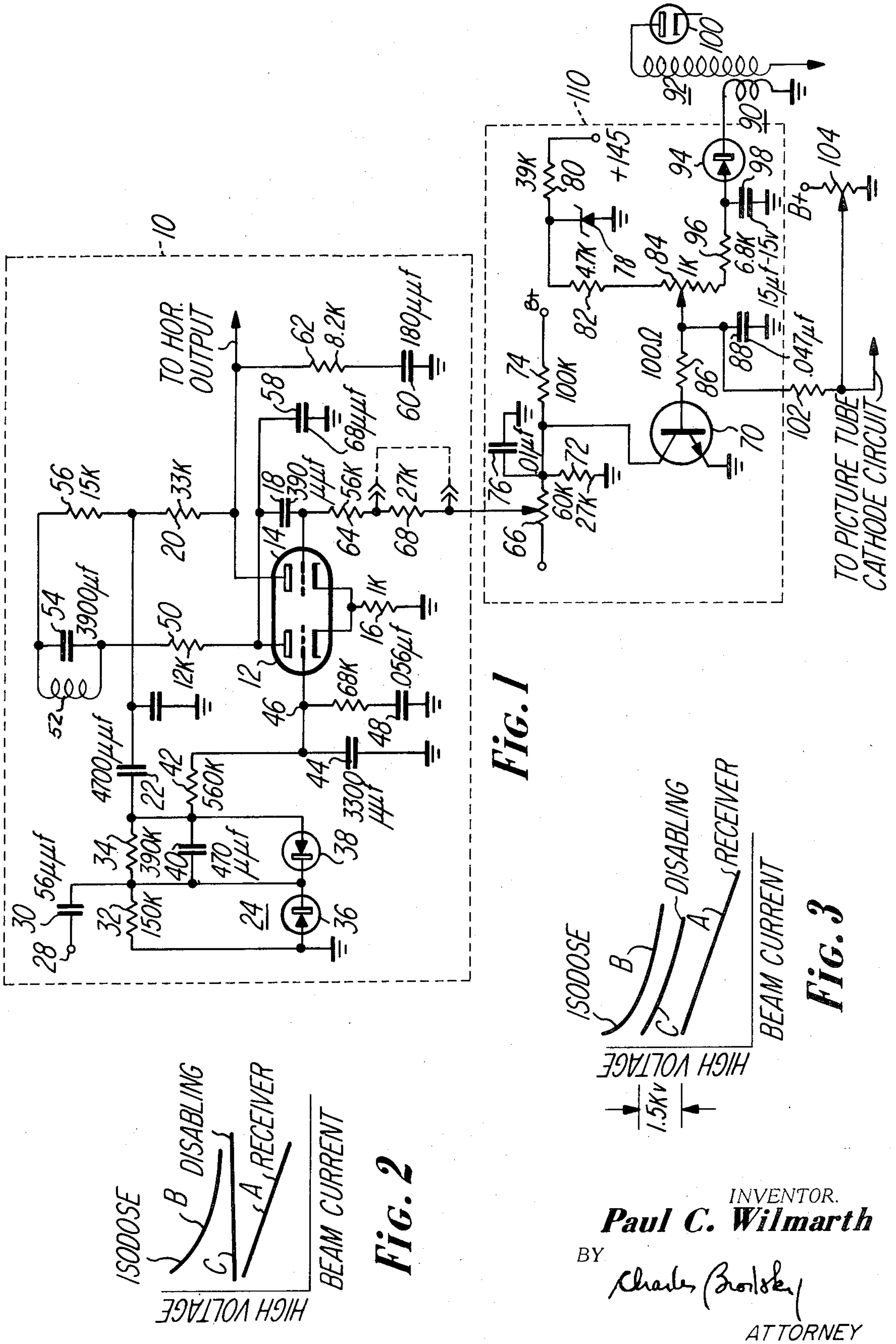
FIG. 1 shows the horizontal oscillator stage and its disabling circuit of Application Ser. No. 144,457, as modified in accordance with the present invention.
FIG. 2 shows a graphical representation of a plot of the high voltage developed as a function of picture tube beam current for a television receiver employing the disabling circuit of this, 144,457 application.
FIG. 3 shows a graphical representation of a plot corresponding to that of FIG. 2, but for a television receiver employing the disabling circuit as modified in accordance with the invention described herein.

In FIG. 1, the horizontal oscillator stage is enclosed within the dashed rectangle 10, and is controlled by the disabling circuit within the dashed rectangle 110. As described in conjunction with the Ser. No. 144,457 application, the frequency of oscillation of the stage 10 is determined essentially by the time constant network including capacitor 18, resistor 64 (and resistor 68 when included to optimize performance with different characteristics of the triode sections employed), and the resistance to the right of the variable arm of the horizontal hold control potentiometer 66, as shown. A negative direct voltage developed at the junction of a rectifier 94 and a capacitor 98 through a rectifying and filtering action is provided to the base electrode of transistor 70 via resistors 86 and 96, and the disable adjust potentiometer 84. This negative direct voltage is combined with a relatively stable positive direct voltage developed at the junction of a zener diode 78 and resistor 80 through a coupling by means of resistor 82 and the disable adjust control 84.

For normal circuit operation—that is, when no X-radiation problems exist—the variable arm of potentiometer 84 is adjusted so that transistor 70 is placed into saturation, effectively grounding the collector electrode of transistor 70 as the emitter electrode thereof is connected to that same point of reference potential. Horizontal hold control 66 is then adjusted to initially set the frequency of horizontal oscillation. For conditions where the flyback pulse is increased to a magnitude indicative of the development of excessive high voltages for the ultor electrode of the cathode-ray picture tube (e.g., resulting from increases in line voltage), the increasing negative voltage developed at the junction of rectifier 94 and capacitor 98 serves to render transistor 70 non-conductive for such settings. The increase in effective impedance at the collector electrode of transistor 70 which results combines with the resistance afforded by resistors 64 and 68, and the horizontal hold control 66 to change the R-C time constant with capacitor 18 and, therefore, the oscillator frequency. As a result, the reproduced image will become unviewable, indicating to the viewer a source of difficulty in the receiver requiring corrective service action. Reference can be made to that Ser. No. 144,457 application for further description of this operation.

With this arrangement as so far described, a plot of high voltage versus picture tube beam current can be made. Such a plot is shown in FIG. 2, where it will be noted that the receiver high voltage decreases substantially linearly as the beam current of the picture tube is increased. FIG. 2 further shows the typical isodose radiation curve established by the Health, Education an Welfare Department, where the maximum high voltage which could be exhibited by the receiver also is noted to decrease with increases in beam current. These two curves are represented by the notations A and B, respectively. The curve of plot C shows the high voltage in the receiver at which the transistor 70 will be rendered non-conductive for a given setting of the potentiometer 84, to thereby disable the horizontal oscillator stage. As noted, the point at which the transistor 70 will respond remains substantially independent of beam current variations.

However, as will also be observed from FIG. 2, at low values of beam current, the exhibited high voltage in the receiver could very well approximate that voltage at which the oscillator will be made to shift off frequency when X-radiation problems occur. This therefore, requires a criticality in the determining of the high voltage point and of the setting of potentiometer 84 to ensure that the oscillator will not go off frequency merely because beam current is low, rather than because X-rays may be emanating from the television kinescope.

In accordance with the present invention, though, a further resistor 102 is included. As shown, this resistor is coupled between the variable arm of the disable adjust potentiometer 84 and the variable arm on the brightness control 104 of the receiver. As indicated schematically, one end of the brightness control 104 is coupled to a source of B+ potential while the other end is coupled to ground. The variable arm of the brightness control is effectively coupled through apparatus (not shown) to the cathode circuit of the television picture tube so that decreases in brightness occur as the control 104 is moved in the direction towards B+. With the addition of resistor 102 in the circuit 110, it will be seen that at low levels of brightness, a further positive direct voltage is coupled to the base electrode of transistor 70, to delay the point at which the transistor 70 will become non-conductive to change the oscillator frequency. As brightness increases, the effective decrease in positive direct voltage coupled from the brightness control through resistor 102 to the transistor 70 will again change the bias at its base electrode so as to permit the transistor to respond to different high voltage conditions at that time. In effect, therefore, this coupling through resistor 102 dictates the need for the development of a larger negative voltage from the flyback pulse at low brightness levels in order to render the horizontal oscillator asynchronous, and for lesser negative voltages at higher brightness conditions. By proper selection of values for this resistor 102, the disabling high voltage can be changed from its relatively fixed value (as in FIG. 2) to a value which varies with beam current—and in a manner resembling the isodose curve for the picture tube.

Such a plot follows in FIG. 3 by selecting a resistance value for resistor 102 of 4.7 megohms in conjunction with the other values illustrated in FIG. 1. As shown in FIG. 3, operation at low beam currents provides a considerable safety margin in the selection of the point at which the transistor 70 will become non-conductive to alter the oscillator frequency. Particularly, at low beam currents, it will be seen that a leeway of some 1.5 kilovolts exists in setting the disable adjust potentiometer 84 to prevent asynchronous operation at these currents for normal circuit operation. More particularly, it will be seen that the inclusion of this resistor 102 more nearly permits the disabling voltage to vary as a function of beam current in much the same manner as the isodose high voltage curve varies with beam current. A more stable circuit operation will thus be seen to result by the insertion of this delay resistor 102.

While there has been described what is considered to be a preferred embodiment of the invention, it will be apparent that modifications may be made by those skilled in the art without departing from the scope of the teachings disclosed herein.

What is claimed is:

1. In a television receiver having an image display device, a deflection circuit including an oscillation signal generator, and a high voltage circuit responsive to the generation of such oscillation signals to develop the high voltage needed to operate said display device, and wherein a resistance-capacitance time constant network is also included to set the frequency at which said oscillation signals are generated and to vary such frequency in a direction to render the image reproduction of said display device unviewable in response to the development of a control signal reflecting a high voltage condition in excess of the upper limit of a prescribed operating range, the combination therewith of:

first means for manually setting the beam current flow in said display device as a function of a direct voltage generated thereby and applied to a control electrode of said display device; and second means coupled to additionally receive at least a portion of said direct voltage and to alter the control signal applied to change the frequency of said oscillation signals as a function of beam current flow;

whereby the protective alert provided as to the existence of high voltage problems within said receiver when the image reproduction of said display device is rendered unviewable occurs for different conditions of high voltage as said beam current is manually adjusted.

2. The combination of claim 1 wherein said second means is coupled to alter said control signal in a direction whereby said protective alert is provided for conditions of greater high voltage in excess of the upper limit of its operating range when beam current is set low, as contrasted with lesser high voltages in excess of the upper limit of its range when beam current is set high.

3. The combination of claim 2 for use in a television receiver incorporating a transistor biased to a first state of conduction for the development of high voltage within its prescribed range of operation and changed to a non-conductive condition for the development of high voltage in excess of the upper limit of its operating range, and wherein said change in transistor conduction is translated into a change in the resistance component of said time constant network determining the frequency at which said oscillation signals are generated, further characterized by said second means providing its direct voltage to alter the bias on said transistor as a function of beam current flow.

4. The combination of claim 3 for use in a television receiver wherein said transistor is biased by a first relatively stable direct source of positive potential and by a negative potential of a magnitude reflecting the development of high voltages within said receiver, additionally characterized by said second means applying a further positive potential to said transistor to delay the switching of said transistor from a saturated condition to a non-conductive condition as a function of beam current flow in said display device.

* * * * *